United States Patent
Even-Zohar (10) Patent No.: US 6,738,065 B1
(45) Date of Patent: May 18, 2004

(54) CUSTOMIZABLE ANIMATION SYSTEM

(76) Inventor: Oshri Even-Zohar, SanderijnStraat 4I, Amsterdam (NL)

( * ) Notice: Subject to any disclaimer, the term of this patent is extended or adjusted under 35 U.S.C. 154(b) by 339 days.

(21) Appl. No.: 09/637,264

(22) Filed: Aug. 10, 2000

Related U.S. Application Data (60) Provisional application No. 60/148,032, filed on Aug. 10, 1999.

(51) Int. Cl.$^7$ ............................................... G06T 17/00
(52) U.S. Cl. ..................................................... 345/473
(58) Field of Search ................................ 345/473, 474, 345/418, 419, 420

(56) References Cited

U.S. PATENT DOCUMENTS

| | | |
|---|---|---|
| 4,999,553 A | 3/1991 | Seraji |
| 5,048,095 A | 9/1991 | Bhanu et al. |
| 5,375,195 A | 12/1994 | Johnston |
| 5,561,745 A | 10/1996 | Jackson et al. |
| 5,623,428 A | 4/1997 | Kunii et al. |
| 5,625,577 A | 4/1997 | Kunii et al. |
| 5,835,693 A | 11/1998 | Lynch et al. |
| 5,923,791 A | 7/1999 | Hanna et al. |
| 6,088,042 A | 7/2000 | Handelman et al. |
| 6,115,052 A | 9/2000 | Freeman et al. |

FOREIGN PATENT DOCUMENTS

WO    WO 97/40471    10/1997

OTHER PUBLICATIONS

Molet, Tom et al, An Animation Interface Designed for Motion Capture, IEEE Computer Animation 97, Jun. 1997, pp. 77–85.

*Primary Examiner*—Cliff N Vo
(74) *Attorney, Agent, or Firm*—Maine & Asmus (57) ABSTRACT

The present invention is a system and method to provide customizable animation. A motion capture database houses a library of human motion that is accessible via a client-server connection. Users are allowed to select motion sequences and alter these motions in real time over a networked connection to create new and original works of art. In one embodiment, blender software is used to interpolate and extrapolate from existing library data to create the new and original motion sequences, that are developed to comply with bio-mechanical laws, physics and human anatomy. In another embodiment, users can bypass the bio-mechanical laws, physics and human anatomy and create mutations of the motion capture data. The present invention not only allows real time animation manipulation, but it is accomplished over a network by using a client application and accessing the motion capture library and blending algorithm. The created animation is created is purchased over the Internet, allowing a cost-effective means to create and purchase animations.

18 Claims, 10 Drawing Sheets

CUSTOMIZABLE ANIMATION SYSTEM

CROSS REFERENCE TO RELATED APPLICATIONS

This application claims priority under 35 USC §119 to pending U.S. patent application Ser. No. 60/148,032 filed on Aug. 10, 1999, which is incorporated herein by reference for all purposes.

BACKGROUND OF THE INVENTION

1. Technical Field of the Invention

The present invention most generally relates to computer animation, and more specifically to an animation system that blends motion capture data into a customizable work incorporating motion capture data that produces animation that is much closer to real life movements.

2. Background of the Invention

Animation generally refers to the combination of graphics with the dimension of time. When single images are sequenced together, it gives the appearance of movement. Prior to computers, animators drew hundreds of images to represent a single cartoon movement. Computers now automate the drawing of the images to some extent and aid in manipulating the images to portray certain movements.

Computer animation is well known in the art, and the animator uses the processing power of the computer to create images and motion sequences that represent the desired animation. While it is relatively simple to create jagged and unrealistic movements, generating interactive sequences of animation that follow natural human/animal motion is difficult to create.

To produce quality computer animation, it is necessary to study the motions of the object being represented and form an animation program on the basis of the analysis. Animation that perform the motions of a human require observation by the animator. On the basis of the observations, a program for producing the same motions by the computer model is formed. But, observations are subjective and based on the understanding of the animator. Therefore, the animator's representation always incorporate some deviation from reality.

An animator applies kinematics to the motions, which describes the motions only in terms of positions, rotation, scaling, velocities and accelerations, neglecting the forces and torques responsible. Kinematics analysis only generates a line picture representing parts constituting a human or animal body, and a three-dimensional model of the human or animal body cannot be displayed realistically on a screen.

Keyframing has been used to produce animation that involves identifying the position of body parts and interpolating between the positions of the body parts in successive key frames to generate the intermediate positions of the body parts over the time interval of the animation. Forward kinematic models have generally been discussed in relation to the interpolation techniques. This concept of keyframing builds motion sequences frame by frame and is fairly costly and time consuming. In addition, this method requires expertise to generate quality realistic motions.

Another method of computer animation, motion capture, users sensors attached to a subject which are used to capture data representing the positions of the joints/body parts over time during the performance of a desired motion. The result is a recorded motion sequence for a particular motion. This recorded motion drives a forward kinematic model to produce a desired animation. There are several disadvantages in the prior art associated with motion capture, namely the recorded motion data is sometimes limited by the motions of the recorded subject.

Inverse kinematics (IK) for computer animation has also been used to a limited extent. Inverse kinematics processes a desired position in three-dimensional space and is used to calculate body joint angles. In this approach the particular body part is moved to the desired position resulting from the computer processing. Inverse kinematics often is sometimes used with keyframing to in manipulating the subject into the desired positions with animated character movements.

The IK methodology is based upon complex matrix manipulations that require significant amounts of processing to determine the joint angles associated with limb movements. The amount of processing increases as a cubic of the number of joints involved, translating into lengthy processing times when numerous joints are involved. A human being has more than 200 degrees-of-freedom, which makes it practically impossible to use matrix-based inverse kinematic methods to interactively animate any realistic human or animal-like character in real time. And, matrix-based IK methods may not even work on certain joint configurations known as singular configurations. Furthermore, the prior art notes that with multiple limb and joint movements, the end result of the computations will not appear natural.

In addition, prior IK methods must converge to a solution before the results of the computation can be used for the animation. Partially computed results causes unstable, jerky and oscillatory motion of the limbs, with large positioning errors.

Animation based on keyframing and motion capture is also not highly successful with interactive applications, such as video games and virtual reality simulators. The virtual world of interactive video gives a user total freedom within a three dimensional (3D) space. But, the animator typically employs existing animation and works within the realm most familiar, producing animated characters that all move in like manner.

Besides resulting in poor quality and non-original movement sequences, the existing technology is time consuming and laborious. The frames are created for each movement, and there must be numerous frames with slight movements or the resulting animation appears to move in a jerky fashion. In order to reduce the workload, animators usually limit the number of moving parts. However life-like movement is usually the result of multiple joint and limb movement and using a lesser degree of movement results in an unnatural animation.

An alternative to key-framing and motion capture techniques to create animation is behavioral animation. Behavioral animation refers to movements generated in response to commands and interaction with the environment. This method of animation relies more heavily on computer processing to determine the movement sequence to accomplish the command. High-level goal-based behaviors are typically made possible by using a combination of forward kinematics and inverse kinematics. One advantage of behavioral animation is that the movements can be created on-line and modified in real-time.

Dynamics provides another method of motion analysis. Dynamics analyzes motions of objects based on the relation between movements and forces, as compared to kinematics, which provides motion analysis in terms of positions, velocities and accelerations. Dynamics allows more complex behavioral or animated results. But, computer analysis of motions utilizing dynamics requires data on parameters such as the moments of inertia, the centers of gravity, joint friction and muscle/ligament elasticity of the moving body being represented by the animation. Dynamics motion analysis also requires complex dynamics equations of multiple and simultaneous differential equations.

Solving a problem based on dynamics involves differential equations that describe the relationship between mass and force and torque. There are a number of equations used for describing dynamics, but the most familiar formulations is Lagrange's equation:

$$\partial L/\partial q_i - d/dt \partial L/\partial q_i + \lambda \partial f/\partial q_i + Q_i = 0$$

where L is the Lagrangian given by kinetic energy (T) minus potential energy (P), $q_i$ is the ith coordinate, f is a constraint equation, $\lambda$ is an undetermined multiplier, and $Q_i$ is the force or torque applied to the ith coordinate.

In general, the prior systems and methods have been unable to provide realistic and like-like motions that are affordable. The complex processing requires very expensive and sophisticated equipment, and time-consuming.

There have been many attempts to alleviate the aforementioned problems and create a natural looking animation that is cost-effective and can be developed quickly and with increased creativity. The invention of PCT/US97/05513 '513 is an animation system involving online computational methods for coordinating limb movements of articulated characters by solving associated forward and inverse kinematics problems in real time subject to multiple goals and constraints. The '513 invention determines how the joints of an interactive character should rotate as a function of time to produce goal-directed limb movements.

The '513 invention uses an on-line successive approximation method for solving inverse and forward kinematics problems concurrently, taking into account multiple goals and constraints. As a result, the '513 invention is capable of producing fully interactive goal-directed behaviors in real-time for three-dimensional articulated characters with multiple limbs through the simultaneous satisfaction of position, alignment, posture, balance, obstacle avoidance, and joint limitation constraints.

In order to perform such animation, the '513 invention performs separate calculations at each joint using goal-based motion primitives by a process which produces a set of joint angle movements that attempt to satisfy a higher-level goal, such as a positioning, alignment, posture, balance, obstacle avoidance, or joint limitation constraint. A geometric successive approximation process simplifies the problem of limb coordination.

SUMMARY OF THE INVENTION

One object of the present invention is an animation system that utilizes custom blending of motion sequences in real-time. The blending uses motion sequences from comparatives of a motion capture libraries as a starting point and customizes the sequences for the desired effect.

A further object is a system that uses inverse kinematics for linear computations of rotation (degrees) of all limbs. Forward dynamics are used to calculate a blend per limb that considers the temporal acceleration/velocity at any given frame of the source and any given frame of the destination. The blending results in a dynamic velocity based blending.

An object of the invention is a customizable animation system that provides network access to a database of recorded motion sequences and a means for customizing motion sequences over the network. Network in this context is defined any Internet, Intranet, and wireless interconnection between computer systems. An additional object is to provide access anywhere and anytime to the database and the tools required to customize motion sequences in real time.

A further object of the invention is a customizable animation system that permits a user to pay only for the sequence generated. Payment per frame or per motion sequence provides an inexpensive means of authoring new motion sequences at a fraction of the cost of other alternatives.

The concept of the blending is the capacity to predict the correct bio-mechanical behavior of the human body, as long as it is target driven. If for example you are sitting on a chair, and you decide to get up, it is possible to predict the vector of your perceived trajectory. There are an infinite number of ways to up from the sitting position, however, all the motion variances are created to facilitate the optimal force vector that gets your body to an upright standing position.

The process of going from a seated position to a standing position can be broken down as follows according to the mental processes: 1) Observing obstacles (floor space, nearby objects) and other objects to evaluate distance and assertive elements such as side arms. 2) Comparing an internally generated motion model of the perceived trajectory of getting up, relying on learned motion macro that is learned at an early age by trial and error. 3) Building an anticipatory force vector and begin activating muscle clusters leading to the buildup of perceived vector of optimum for the required standing motion and 4) Evaluating the next macro (eg; what to do after standing) before committing to the perceived vector. Committing to the 'standing up macro' and continuously evaluating the performance of the body.

The underlying premise of the behavioral blender of the present invention is that every human macro can be computed. The two main modules of the present invention are a motion capture library (as compared to the motion memories and 'learned' macros) and two sets of rules. The two rule sets are internal and external. Internal rules refers to the kinematic skeletal bio-mechanical conditions of the bones, muscles, etc . . . The external rule set refers to the environmental conditions such as gravity, objects, and other dynamic forces.

The blender functions by first implementing the internal basic environment that allows blending between two or more sets of motion capture data, subject to the correct bio-mechanical behavior (eg: reaching the fulfillment of a set of conditions relating to marker placement based on skeleton segment length and other variables.

Next, a predictive algorithm is implemented to handle 'perceived' optimal motion vector. (When a user is choosing the source and the destination of the blended sequence, the source's velocities and accelerations are extrapolated, the reverse happens with the destination's acceleration and velocities, The predictive algorithm offers the user the "most natural" blend interval in time. Finally, the environmental rule sets are implemented, facilitating realtime simulations of the velocity/accelerations variances in response to a changing conditions in the environment. Those Simulations make use of Lagrange equations in combinations with the (above discussed) velocity base blends.

The present invention has several components, including a motion database, blender software, custom user interface. A further description of the blending algorithm and template matching as well as a detailed description of motion capture in general is incorporated by reference from the published application PCT/US99/21246 to the same applicant.

The motion capture database comprises an entire full body setup. All the compensatory motions of the body are captured while isolating one body part for the eventual blends. The database contains many general or standard motions such as walking, running, sitting, standing, falling, recoveries, gestures, etc . . .

The blender software computes the blends between any matching elements of the motion databases in a manner that complies with the over-riding bio-mechanical laws. Blends that result in motion that are not natural or are otherwise impossible for the human body to execute are extrapolated to fit a correct behavior.

Another embodiment of the present invention is through the use of blender software using genetic algorithms. Instead of looking at blending motion capture databases according to bio-mechanical laws, parsing those motion sequences through a genetic algorithm and presenting multiple possibilities of variations of thew original motions. The operator can then choose the preferred 'mutation' and parse that sequence through same algorithm to create a new set of variations. Each new selection introduces a new set of mutations for operator selection.

The custom user interface is a GUI interface that allows full access of all subsets and blending methods, or as otherwise prescribed by agreement or license.

The present invention is an Internet product that is downloadable for implementation. The motion capture libraries are also accessible via the Internet. A user can obtain any range of motion capture data and then use the software of the present invention to custom tailor the animation for the desired effect.

For example, if the libraries have a user sequence walking at one pace and another user sequence walking at a different pace, the blender can create any subset between those two data sequences. It is not as simple as an interpolation between data sets—the over-riding laws of bio-mechanics must be accounted for in creating the custom set. As a person walks, there are many forces at work and moving parts. Changing one element of the mix affects all the other elements.

The motion capture data sequences are obtained using sensors attached to various parts of the body. The movements can be plotted a three dimensional space. The blending between two sequences is not a simple interpolation between the plots because the actual trajectory and bio-mechanical laws dictate the outcome.

There are current systems of animation that comply with the bio-mechanical laws, but the resulting motions do not appear natural. The introduction and blending of the motion capture data into the mix creates life-like and natural movements.

Custom motion capture also exists, but involves extraordinary time and expense to create a sequence for only a particular movement. Clip art works for generic images or animation, such as famous landmarks, but does not permit custom tailoring.

Cost advantages of a clip art library that allows you to customize any work create an original work. For example, a walking sequence can be extracted from the library. The user can then custom-tailor the swinging arm movement. The user may then introduce a swinging head motion—which in turn affects the swinging arm movement and the walk. Every tweak by the user creates a new and original work.

Another method of customizing animation is through genetic algorithms. It is a separate way to look at blending where mutations are created depending on the input selections. Mutations of the motion capture data get generated from the behavioral data and a set of different mutations are created for each behavioral alteration. Applying genetic algorithms to variances in motion capture data is another object of the present invention and will yield very different results from the blending.

The blender algorithm uses forward and inverse kinematic equations and Lagrange equations to calculate and determine the joint torque and joint forces at each degree of animation. Although the human body is susceptible to over 200 degrees of freedom, in reality, the number is closer to 40 for realistic applications.

The present invention also describes the use of genetic algorithms the necessary equations and calculations that are modeled in the algorithms for the present invention.

In contrast to the PCT application WO9740471 ('471) application, the present invention accomplishes that which is described in the '471 application as "practically impossible" due to the computationally intensive matrix inverse calculations. The present invention allows inverse kinematic methods to interactively animate any realistic human or animal-like character in real time using both forward kinematics and inverse kinematics.

In distinction, the '471 invention does not use matrix inverse calculations and has computational requirements that scale linearly with the number of joints. Scaling linearly with the number of joints enables the '471 invention to interactively animate moderately complex articulated characters in real time using commonly available personal computers.

Whereas traditional inverse kinematic methods converge to a solution (usually defined as a minimum error condition) before the results of the computation can be used to animate the character. In contrast, the '471 invention is an iterative computational procedure that always produces somewhat meaningful joint motion (with no singularity conditions) after each iteration of the computation. It is not necessary to wait for the '471 process to converge to a minimum error condition. The results of the calculation can be used 'anytime", i.e., within the constraints of a real time animation system. The '471 methods tolerate more tracking error, i.e., greater position, velocity or acceleration error, than matrix inverse methods, but in return provide more natural motion, and faster calculations. The present invention operates in real-time with less tracking error.

Some of the '471 animation techniques are interactive and others are not. The '471 techniques of keyframing and motion capture produce fixed, i.e., scripted and non-interactive motion data. In distinction, the present invention encompasses more interactive elements. And, the present invention integrates interactive motion data with interactive control, which is not disclosed or mentioned in the '471

The demand for motion capture has been growing exponentially. Unfortunately it has been too expensive and too laborious for most applications. The browser of the present invention allows any person to be an animator and blend motion sequences on the high speed servers of the Internet based product. When the sequence is completed, the user simply pays for the 3D data and downloads the data to the users workstation. The software has been benchmarked and works at 15fps on a 56k modem.

A significant advantage of the present invention is the implementation and method of incorporating the system. The present invention has a database of motion capture data that is accessible on-line over an intranet or the Internet. The blending algorithms, either inverse kinematics or genetic algorithms, can be resident on the user's computer system either from purchasing the software or downloaded over the Internet. A further feature of the present invention is to allow on-line and real-time manipulation of the motion capture library on-line. An individual license can be purchased for a particular animation and a new work created by a user on-line, making this a cost-effective and speedy transaction.

Accessing a motion capture library, the present invention allows the user to choose and "blend" motion sequences including individual body parts, until the correct effect is created. The end result is infinitely more flexible than "canned" motion capture sequences, and extremely cost-effective as compared to studio production.

The present invention brings big production motion capture to projects lacking big production budgets, and makes the motion capture animation project faster, easier, and less costly to complete. This system provides a breakthrough in price/performance for 3D animators. Lifelike sequences are built in a fraction of the normal time, at approximately one-tenth the cost of traditional studio production The present invention allows for each human body part motion to be altered independently. The user manipulates a huge library of captured data to produce unique sequences. The blending tools also marries individual sequences to produce smooth, lifelike movements, employing inverse kinematics.

As a networked system, the present invention is accessed through the Internet and is available anywhere and anytime.

In addition, the data sets created by the present invention can be directly exported into a wide range of professional 3D packages including products from SOFTIMAGE™, Discreet™, AliasIWavefront™ and Side-Effects™.

One of the unique features of the present invention is that is allows on-the-fly data sets viewed through the "blender" window. Selected sequences and movements are reviewed in real-time before you commit to purchase and download.

Furthermore, the algorithms continually enforces bio-mechanical rules so that sequences maintain the ultimate in natural physical motion. For even more creativity of movements for non-human characters or to deliberately portray unreal human motion, the rules can be bypassed.

The motion capture data bank is a growing depository of motion capture data. As more data is captured the database will continue to expand.

Another object of the invention is a simple-to-understand interface, allowing the user to quickly select and manipulate motion sequences, then fine tune each body part using slider bars. The graphical user interface permits an untrained user to begin from basic building blocks and customize these animations according to individual preferences.

There are only a few simple steps for using the network based system. First, the user must access the blender download site and download the client browser. The user then selects one or more motion sequences from the data library. Using slider bars, the user modifies and fine tunes individual body parts and manipulates the motion sequences until the desired result is achieved. Once the user is satisfied with the sequence, the user selects a format for exporting the data. The user then selects from the various payment methods and chooses the format for downloading the data. Finally, the user imports the data to the individual animation tool or environment.

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

DESCRIPTION OF THE PREFERRED EMBODIMENT

To those skilled in the art, the invention admits of many variations. The following is a description of a preferred embodiment, offered as illustrative of the invention but not restrictive of the scope of the invention.

Figure 1:
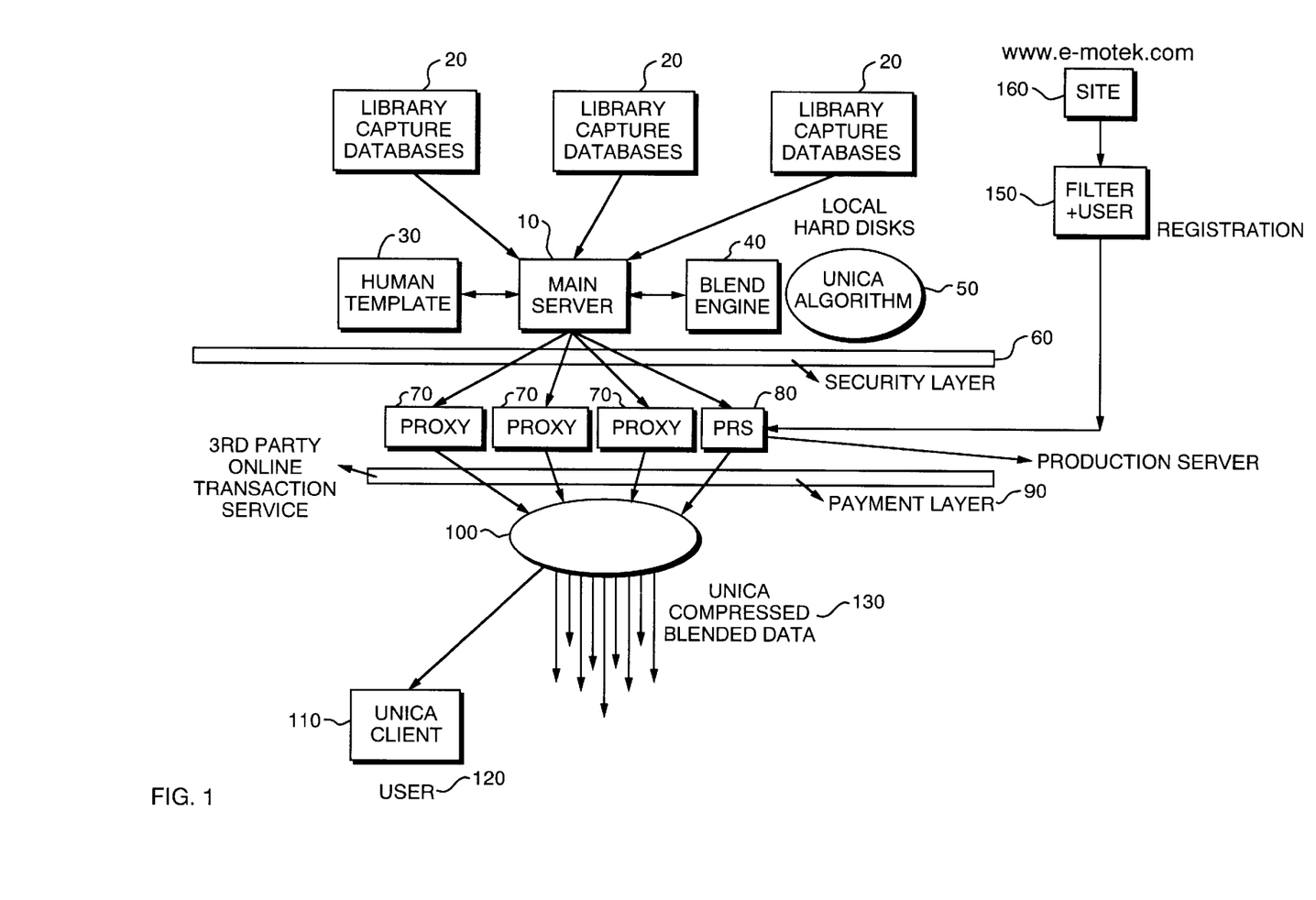
FIG. 1 System overview showing elemental components

FIG. 1 shows a top-level block diagram of the elements of one embodiment of the invention. There is a main server 10 that acts as the administrator of the system. The various other components are interconnected to the main server 10 through a network, wherein a network is defined herein as any means of communicating between devices, including Internet, Intranet, and wireless means.

Motion capture library databases 20 are connected to the main server 10 and house the various captured data. The captured data represents the various motion sequences and actions recorded using the optical and magnetic markers as is known in the art as well as a growing volume of motion sequences that may have been blended.

A human template 30 is accessible to the main server 10 and is used in conjunction with a template matching algorithm as is described in the prior art and published PCT application PCT/US99/21246.

Also connected to the main server 10 is the blend engine 40 that encompasses the UNICA algorithm 50 As described herein, the algorithm 50 uses forward and inverse kinematics, Lagrange equations and even genetic algorithms to blend the data and produce the realistic motion sequences. The blender functions by implementing the internal basic environment that allows blending between two or more sets of motion capture data, subject to the correct bio-mechanical behavior.

The algorithm 50 is implemented to handle 'perceived' optimal motion vector. When a user is choosing the source and the destination of the blended sequence, the source's velocities and accelerations are extrapolated, the reverse happens with the destination's acceleration and velocities. The predictive algorithm offers the user the "most natural" blend interval in time. Finally, the environmental rule sets are implemented, facilitating realtime simulations of the velocity/accelerations variances in response to a changing conditions in the environment. Those simulations make use of Lagrange equations in combinations with the velocity base blends discussed herein.

A security layer 60 tries to protect the main server 10 and the other components from various cybercrimes. A plurality of proxy servers 70 provide the communication access between the outside world and the system of the present invention. The proxy units are basically gateways for connecting users to the main server 10, and the more proxy servers 70 the more accessibility. The proxy servers use login names and passwords to provide secure access once the user 120 has completed an application and downloads the client browser 110. As a networked based system, this invention is accessible anywhere and anytime via the Internet or other network means.

In operation, a registered user 120 accesses the client browser 110 and gains access to the main server 10, the libraries 20 and the blending system 40, 50. The user can work on a motion sequence and even save a sequence for later use, but the actual motion capture sequence is not available until the user 120 goes through the payment layer 90 and purchases the sequence. The payment layer is handled by a $3^{rd}$ party online transaction service. Once purchased, the compressed blended data 130 can be stored by the user 120 in a usable form.

A production server 80 is a specific server dedicated to the registration of new users. It provides a secure interface for unregistered users to access the system in a limited environment. A new user accesses the website 160 and is given limited access through a filter 150 block that requires registration for normal access to the system.

In the preferred embodiment the client computer must have sufficient resources to successfully access and use the client browser and system. The minimum system requirements are shown in Table A.

links to the UNICA client software, 3D application converters, and free motion data samples.

Figure 2:
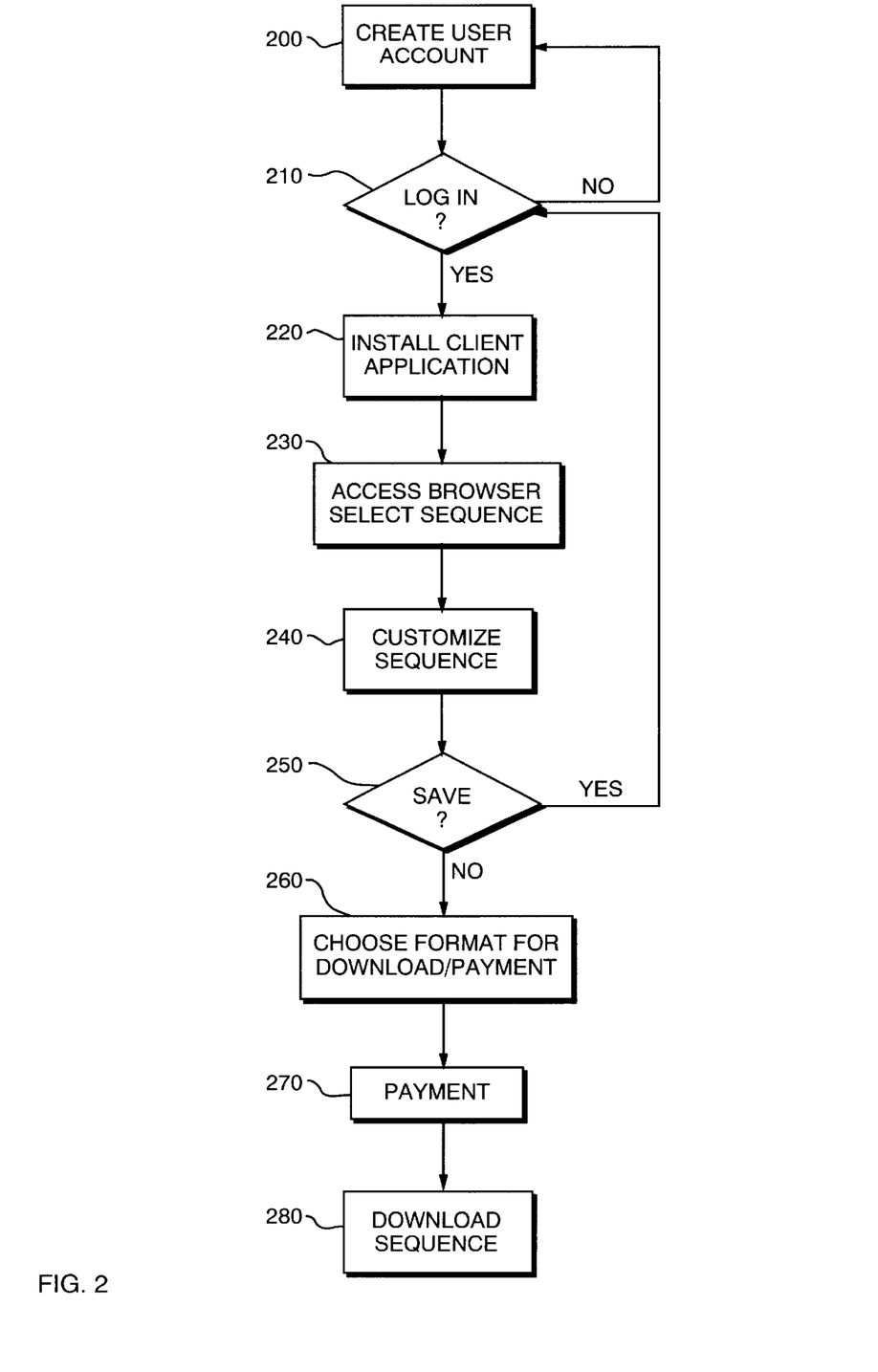
FIG. 2 Simplified Flow Chart

The next step 220 is to login to the system. The user returns to the website and a prompt appears requesting the User Name and Password. At the prompt, fill in the name from the application form and the password received in the authentication email. The best way to enter the correct password is to highlight your password in the message by left clicking, holding the button down, and dragging the cursor over it. When your password is highlighted, press CTRL-C to copy it to your clipboard. Changing the password is recommended.

To install the client application 220 onto the local system it is necessary to download the file. The client application runs on several platforms, and the user selects the appropriate platform, such as the Windows platform.

The file is compressed in Zip format, and should be downloaded and saved to a location that will be remembered. The file size is only half a megabyte, so it should not take that long to download. While on the website, it is recommended to download the related files such as the data converters for the most popular 3D applications, including Softimage, Maya, 3D-Studio Max, and Lightwave. With each of these is a Text file describing the command line parameters needed to run the converter. Finally, there is a UMF file, or UNICA Motion File, as a free sample to use and test out. The user can download one or all of the converters, depending on what 3D application is utilized. Uncompress the files downloaded, install the local client, and launch the client when ready. It is advisable to create a UNICA directory at the location on the local computer to run the client from, and uncompress the files in that location.

After launching, the client application (client.exe), connection to the UNICA server is started automatically as soon as the client application is invoked. The application detects existing connections, but if no connections are detected active, the application will try and start an Internet connection.

TABLE A

Minimum System Requirements

|  | PC | SGI | LINUX |
|---|---|---|---|
| Processor Family | 80386 or above | R2000 or above | 80386 or above |
| Processor Speed | — | — | — |
| Processor Quantity | 1 or more | 1 or more | 1 or more |
| System Memory | 32 MB | 32 MB | 32 MB |
| Hard Drive Free Space | 1 MB | 1 MB | 1 MB |
| Video Memory | — | — | — |
| Internet Connection | 15 fps at 56 k | 15 fps at 56 k | 15 fps at 56 k |
| Operating System | Windows 95/98/NT or 2000 | IRIX 6.2 or higher | Kernal 2.0 or above (Redhat 6.0 or above) |

NOTE: Items with no stated requirements value are not as significant as those that do have specified parameters. Obviously, operation is improved with more memory or faster processor speed.

FIG. 2 shows a flow chart representing the basic steps in the system. The first step 200 is to access the website and join the UNICA user group. In order to join the user group, an application form needs to be completed in order to receive a startup password. Once all the fields are completed, click the "Submit Form" button, and review and accept the License Agreement.

After agreeing to the license, an authentication email will be sent to the email address supplied on the email. The information sent to the user includes a user password and Once the connection is made, a window will appear, prompting you to type in your user name and password. Use the user name created when filling out the application form and the password received in the authentication email. At this point it is advised to verify the personal data and consider altering the password.

Once the User Name and Password have been properly authenticated, the UNICA browser will appear 230. The user can select one or more motion sequences from the data library.

The user can then customize the motion sequences using the browser controls 240. Using slider bars, the user modifies and fine tunes individual body parts and manipulates the motion sequences until the desired result is achieved.

At any time during the customization, the user can save the data for later usage 250. The data is saved locally in a format that is only readable by the client application and browser, but allows the user to pick-up from an earlier customization job.

Once the user is satisfied with the sequence, the user selects a format for exporting the data 260. The user then selects from the various payment methods and chooses the format for downloading the data 260.

The user then pays according to the desired payment option 270. Finally, the user downloads the data imports the data to the individual animation tool or environment 280.

Figure 3:
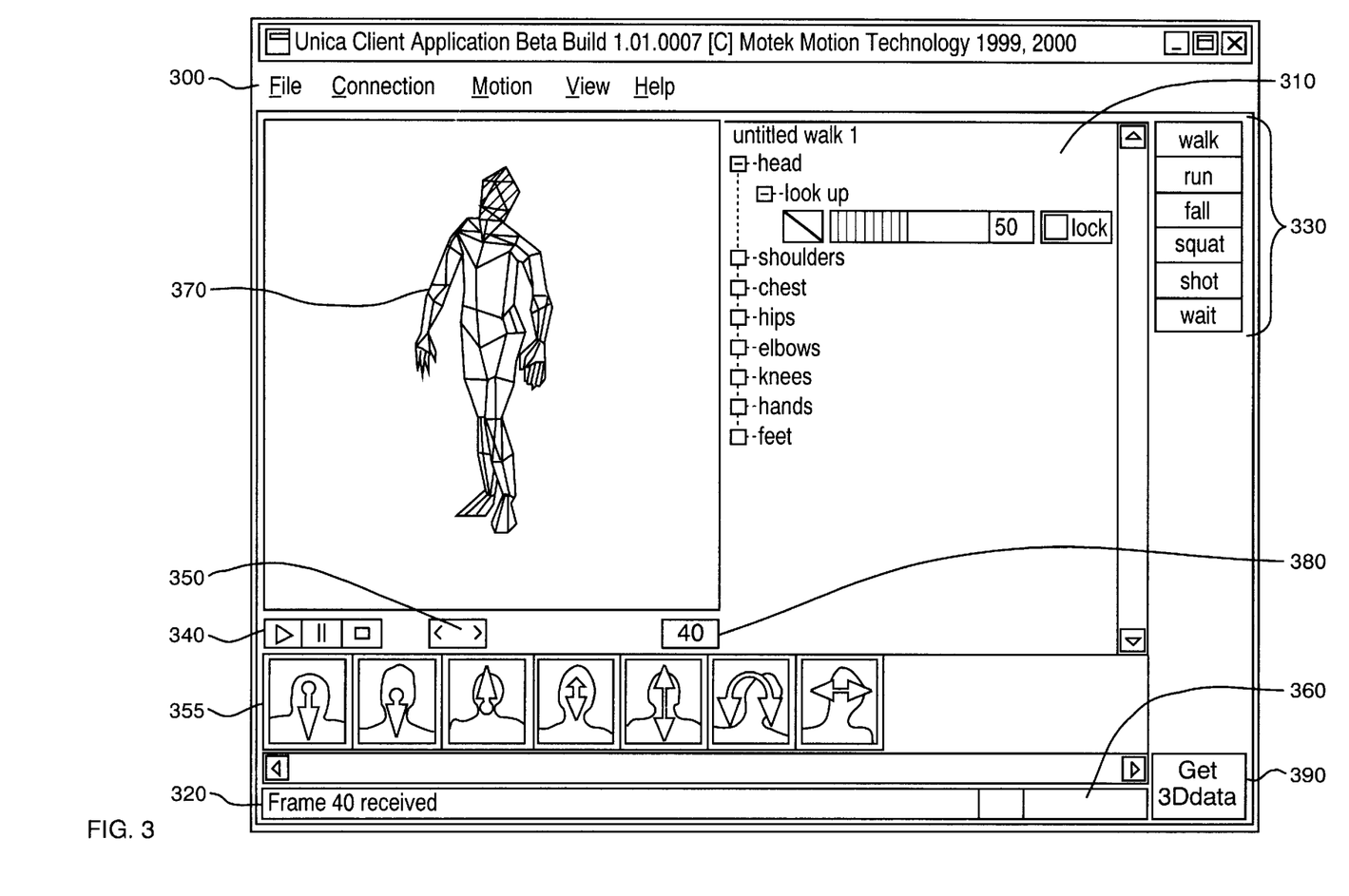
FIG. 3 Client Browser

The browser of the present invention provides the user interface and is shown in FIG. 3. The blending palette has numerous elements, including the Tool Bar 300, Blending Area 310, Status Bar 320, Sequence Selection 330, Viewer Play Controls 340, Frame Slider 350, Source List Icons 355, Bandwidth Usage Meter 360, Viewing Area 370, Total Frame Count 380 and Get 3D Data 390.

The Tool Bar 300 (located in the upper left-hand corner) is the area where the user can change general UNICA browser settings. The menu breakdown is as follows: FILE, CONNECTION, MOTION, VIEW and HELP.

Tool Bar—FILE

New—Select this option to start a new blend.

Open—Allows you to open a previously saved blending session from your hard drive.

Save—Saves your current blending session to the hard drive. If a file name has not been previously defined, then you will be prompted for a new file name.

Save As—Saves your current blending session to the hard drive. You may select a preexisting file name or create a new name for this session.

For example, once a blend is finished or the user wants to discontinue blending, simply save the blend to the local hard drive or local network. From the FILE menu on the tool bar, select Save or Save As, which produces a pop-up window with various options, including:

Up one directory: This sets the current directory to one level above.

~/Home: Brings you to your home directory.

/Root: Brings you to the root directory of the current drive/partition.

Current dir: Displays the current directory in the path field.

*.upf: Displays all Parameter Files in the current location.

* All files: Displays all files and folders/directories in the current location.

.Hidden files: Displays hidden files in the current location.

*/Directories: Displays only the directories available in the current location.

OK: Executes the save process.

Cancel: Stops the save process and brings you back to the Browser.

Exit—Exits the browser.

Tool Bar—CONNECTION

Change Server—As the usage grows, more servers will likely be installed globally for optimum performance. This option allows the user to select the best server to achieve maximum performance.

Change User—If multiple users access the client browser on the same workstation, the user id can be changed using this option. This is useful in separating blending sessions of multiple users.

Tool Bar—MOTION

Get 3D data—This option allows the user to enter the sequence name. A payment/account summary screen is presented and the user can proceed to making payment on the new creation or can cancel out of the payment segment.

Play control properties—This option allows the user to customize the video configuration to help optimize the blending experience. For example, with a 56 k connection, select 15 frames per second. If more bandwidth, say dual ISDN or better, is available, then select 30 frames per second, etc.

Tool Bar—VIEW

Figure 4:
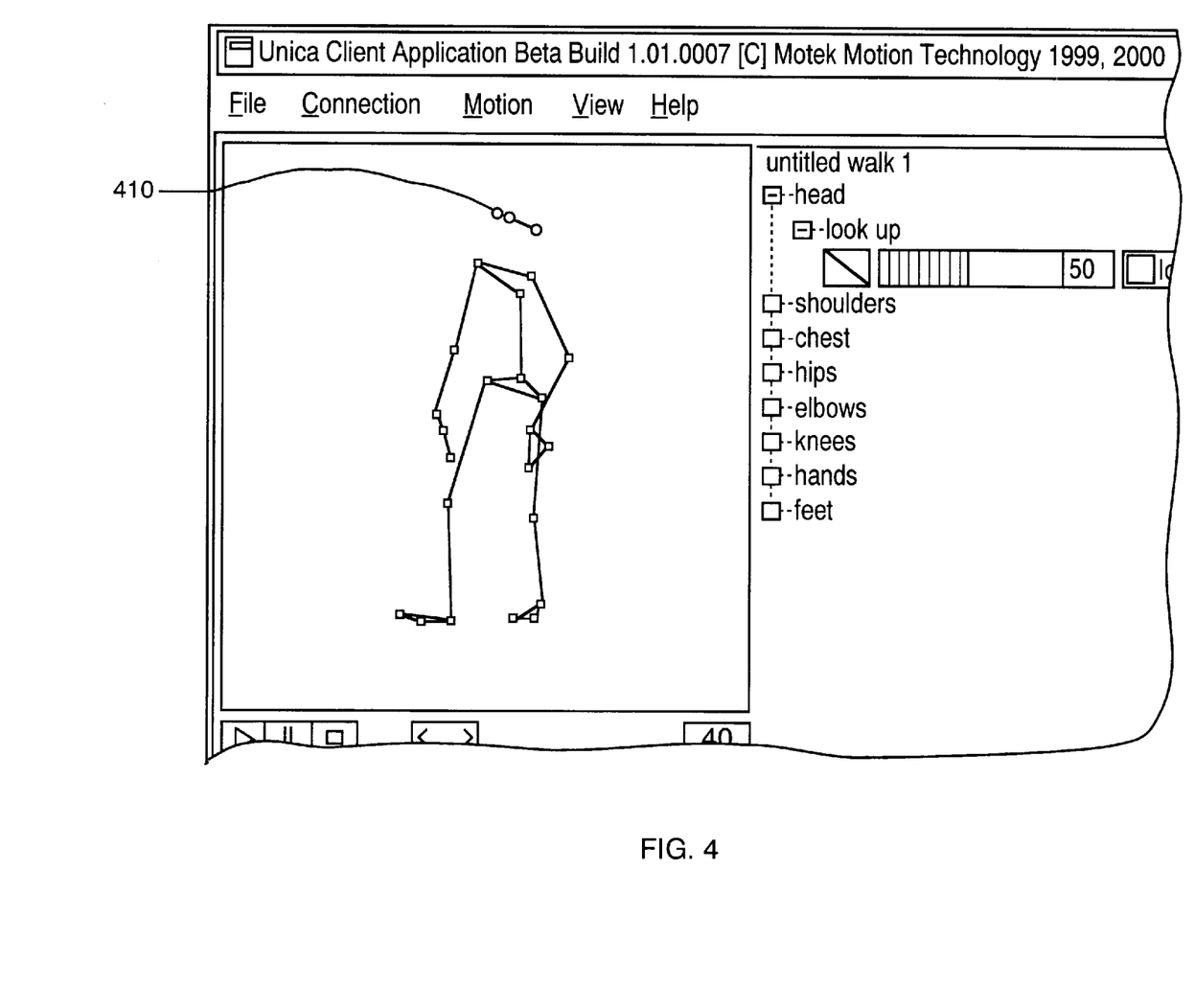
FIG. 4 Viewing mode of a motion sequence (source or blend) which shows the original marker placement on the body.

Markers—A Viewing mode of a motion sequence (source or blend) which shows the original marker placement 410 on the body FIG. 4.

Figure 5:
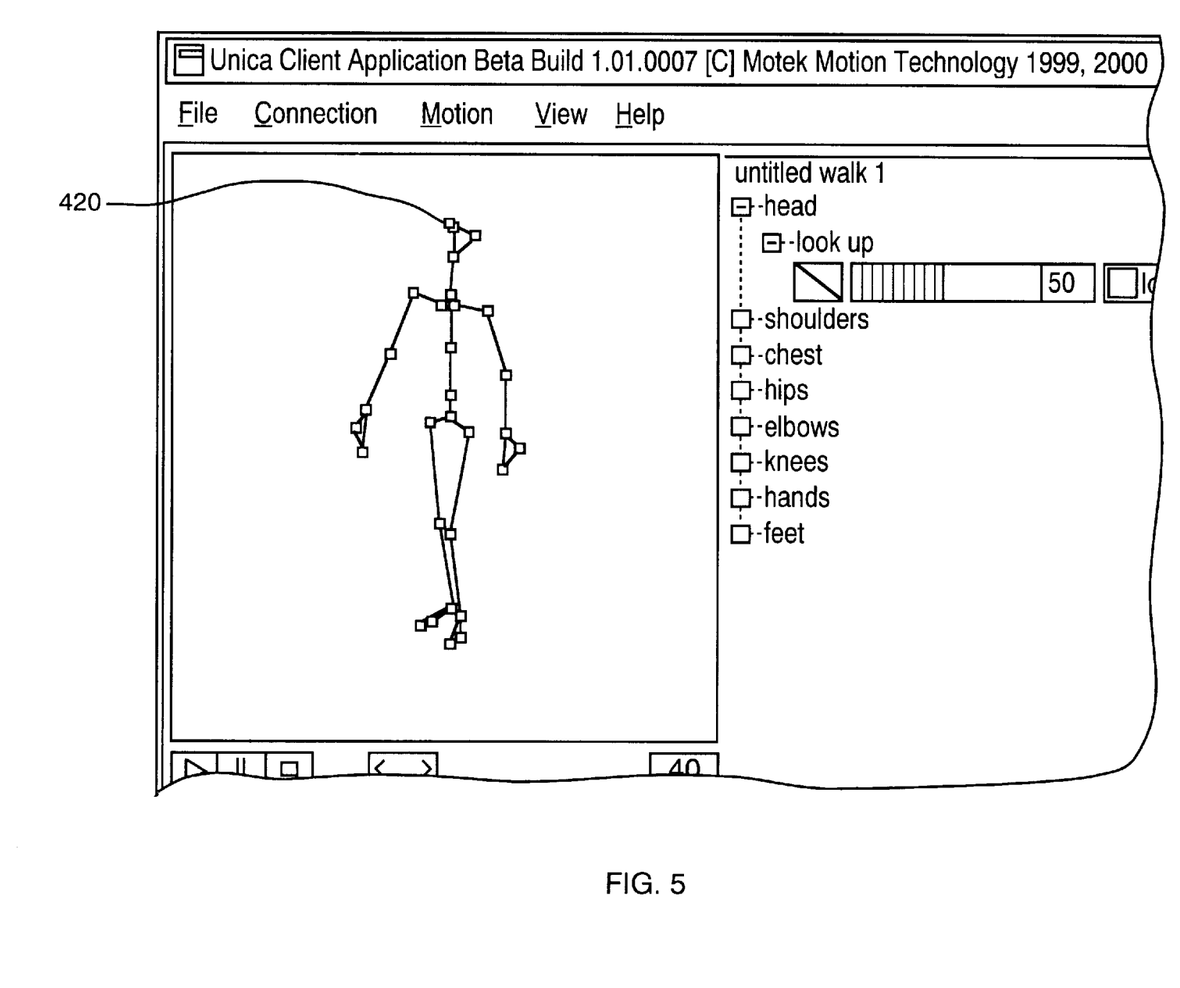
FIG. 5 Viewing mode of a motion sequence (source or blend) which shows the correct skeletal structure under the markers, including the right offsets and joint rotation values.

Skeleton—A Viewing mode of a motion sequence (source or blend) which shows the correct skeletal structure under the markers 420, including the right offsets and joint rotation values FIG. 5.

Figure 6:
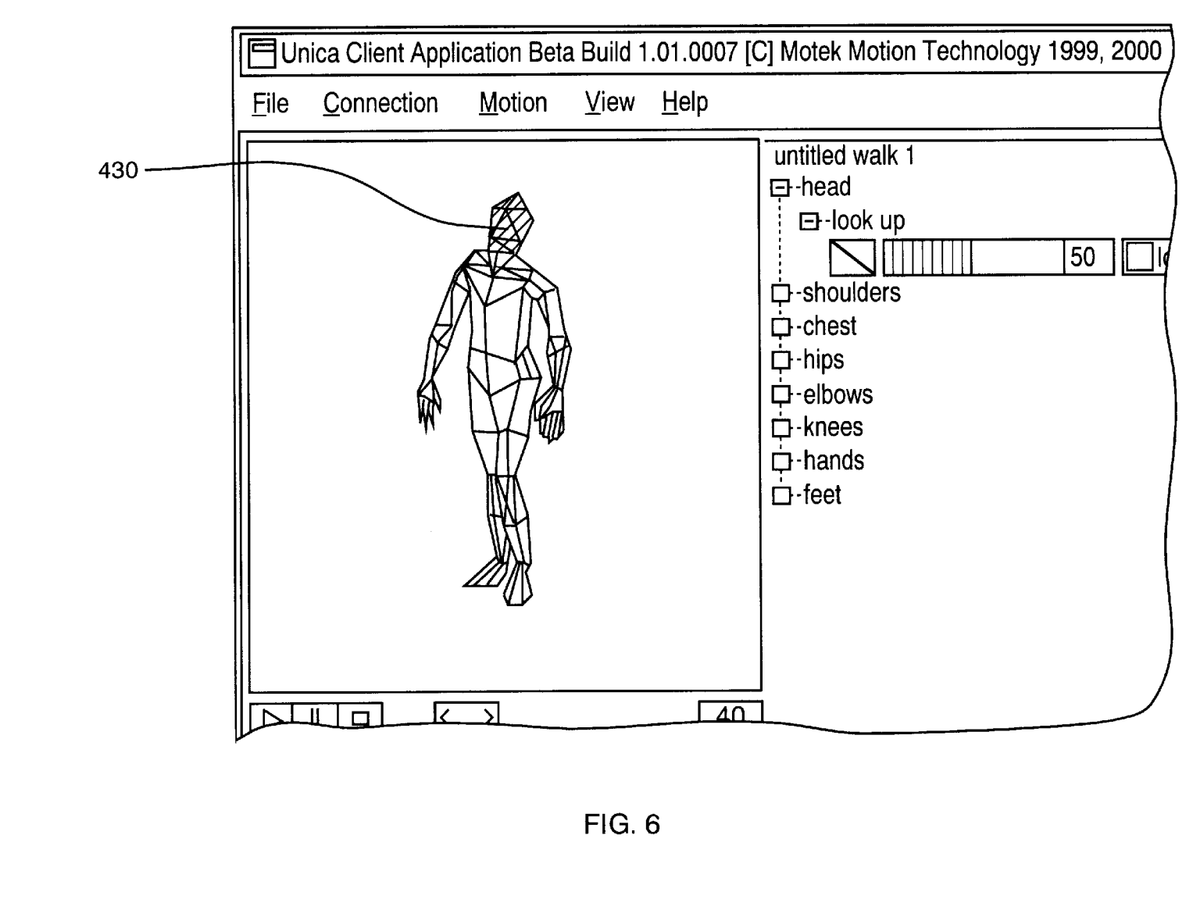
FIG. 6 Viewing mode of a motion sequence (source or blend) which shows how a 3D deformation model behaves in motion.

Geometry—A Viewing mode of a motion sequence (source or blend) which shows how a 3D deformation model 430 behaves in motion FIG. 6.

Tool Bar—HELP

Help—Brings user to the User manual on the UNICA website.

About—Brings user to the website overview.

A default sequence is the natural walk. To switch to another sequence, the user can simply click on the Sequence Selector 330 in the upper right-hand corner of the browser window. Sequences are continuously being added to the library and posted on the server. Sequences such as wrestling, golfing, fight scenes, and animals provide an array of possibilities for the creative animator.

The Viewing Area 370 (located in the left-hand side) is the area that allows the user to change general browser settings. The Viewing Area menu breakdown is as follows:

1) Viewer Play Controls 340 (located below the Viewing area) allow the user to play, pause or stop a blending loop. This is useful if a single frame is to be focused on during the blending process.

2) Frame Slider 350 (located to the right of the Viewer play controls) shows the frame id currently being viewed in the Viewing area. Frames can be individually selected by simply dragging this slider to the left or right.

3) Total Frame Count 380 (located to the right of the Frame Slider 340) shows the total number of frames in this blending sequence. The number shown here will vary depending on the sequence that is being blended.

By clicking on any of the Source List Icons 355 user is requesting from the server to add the selected source to the display list. If a source is already open (default head source) a blend between the default and the new selected source will be seen. To view sources without any blending make sure that you are viewing one source only. (e.g.: remove the default source first.)

The Status Bar 320 provides process information to the animator. Such items displayed here are: number of frames received from the UNICA server, starting file paths, etc . . .

The Blending Area 310 allows the user to make changes to the data in the blending process. This is done using sliders and blend types in the Blending Area 310. The model is broken down by area of the body (i.e. head, shoulders, hands, feet, etc.). Within each area of the body a further breakdown can be accomplished.

The slider bar and value display are the key interfaces in the blending process. The user can change the values of each characteristic by clicking or dragging on the associated slider bar. Note that the numerical value to the right adjusts accordingly. The lock checkbox, to the right of the slider and value display, holds the value of the slider. This is useful when you do not want this value to be modified by any of the other characteristic value changes.

The Blending Type controls the amount of "leakage" of motion from the active (currently under editing) body part, to the rest of the body. Since all the sources are made from full body motion capture sequences, the amount and the path of the leakage will create different blends.

By clicking on the leakage icon of the particular item that you want to modify, a pop-up window of leakage blend types appears. Simply click on the desired type to select.

Figure 7:
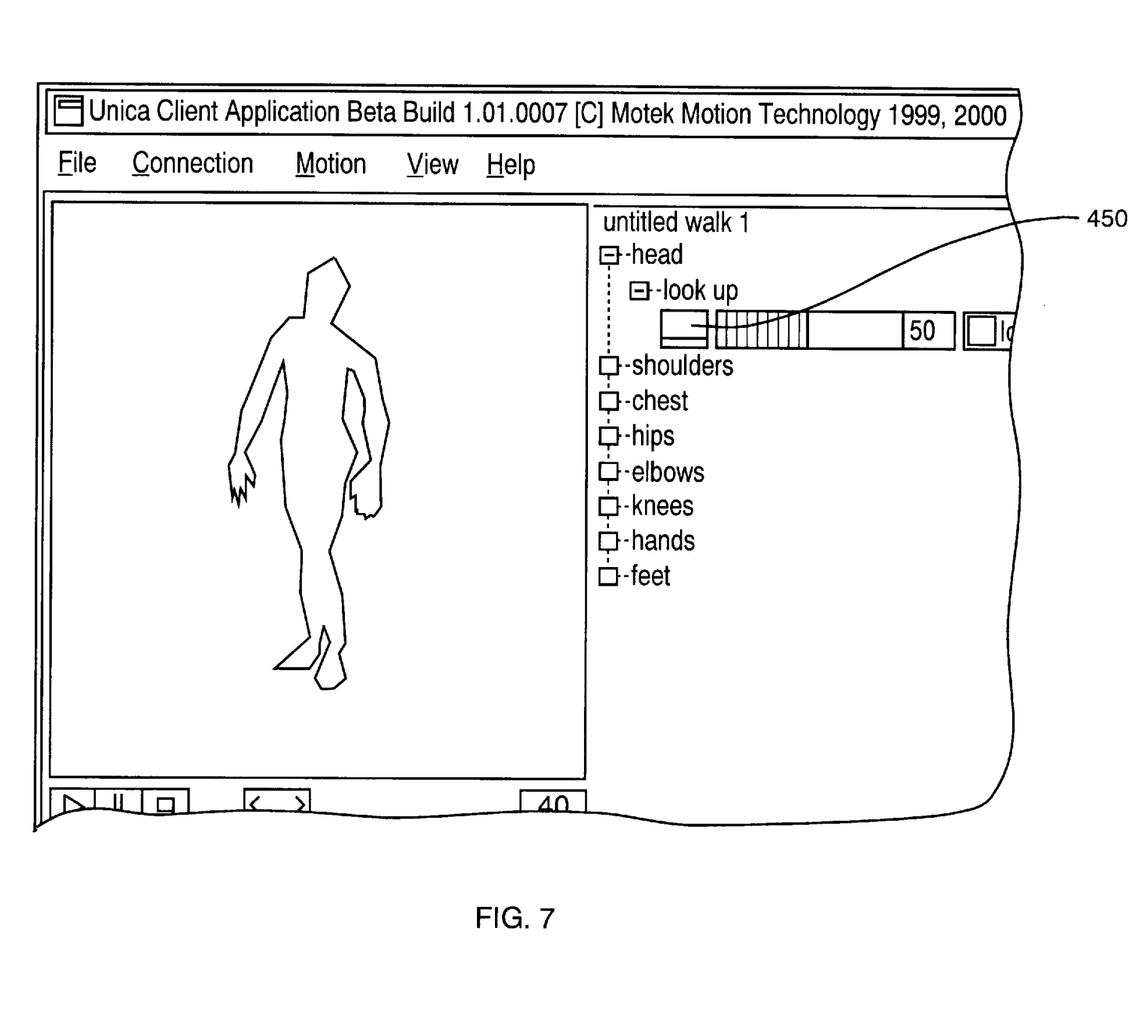
FIG. 7 Constant decay distribution for leaking.

There are four blend types, Constant, Linear Decay, Exponential Decay, and Cutoff. Constant refers to a full leakage, similar to average mix and is illustrated in FIG. 7. The leakage icon 450 shows the representation for constant decay under the blending type.

Figure 8:
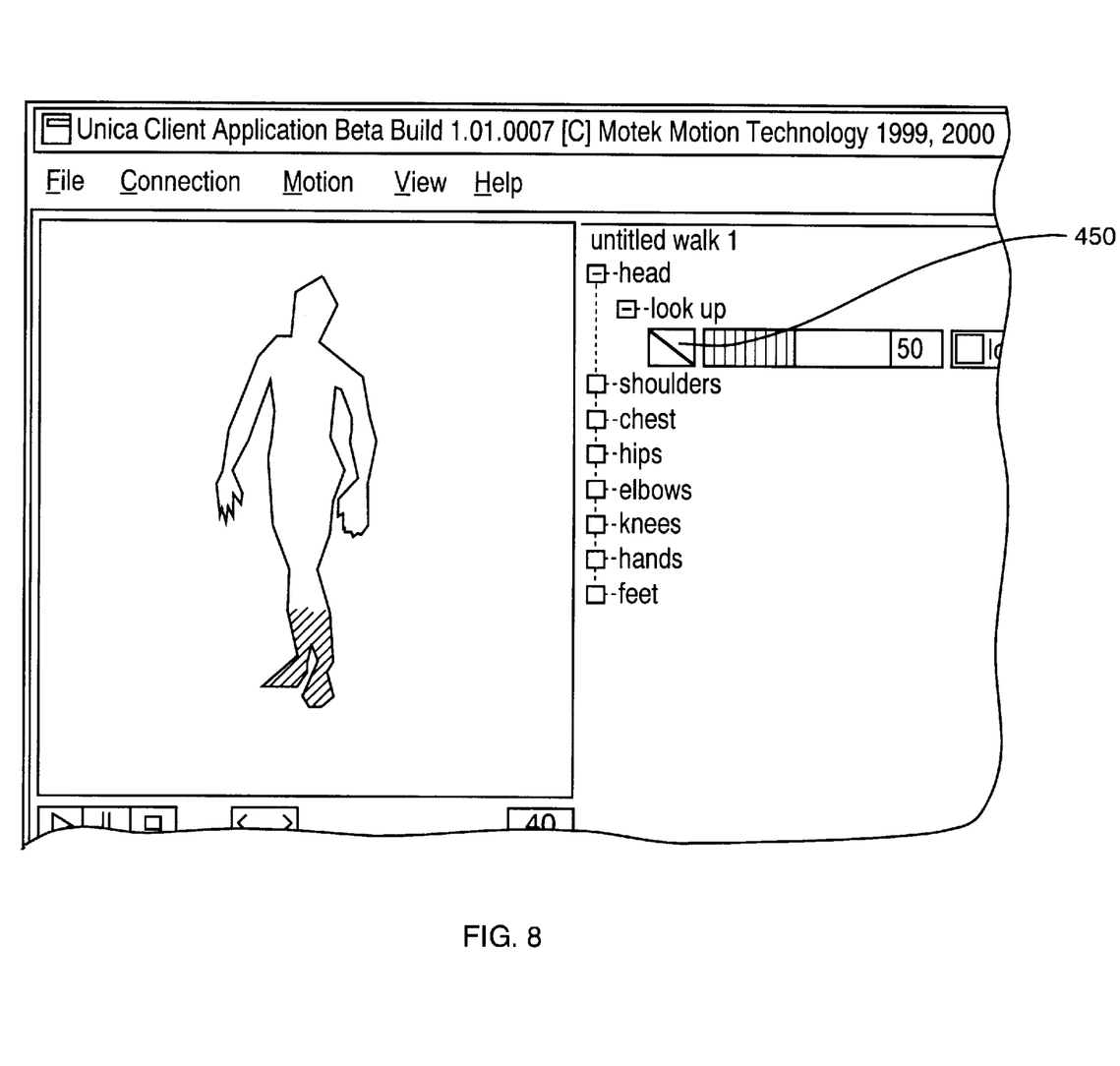
FIG. 8 Linear decay distribution for leaking.

Linear Decay, wherein depending on the active body part, motion will "leak" down the skeleton hierarchy so that the body parts furthest away from the active body part will be compensated minimally is shown in FIG. 8. The leakage icon 450 shows the representation for linear decay under the blending type.

Figure 9:
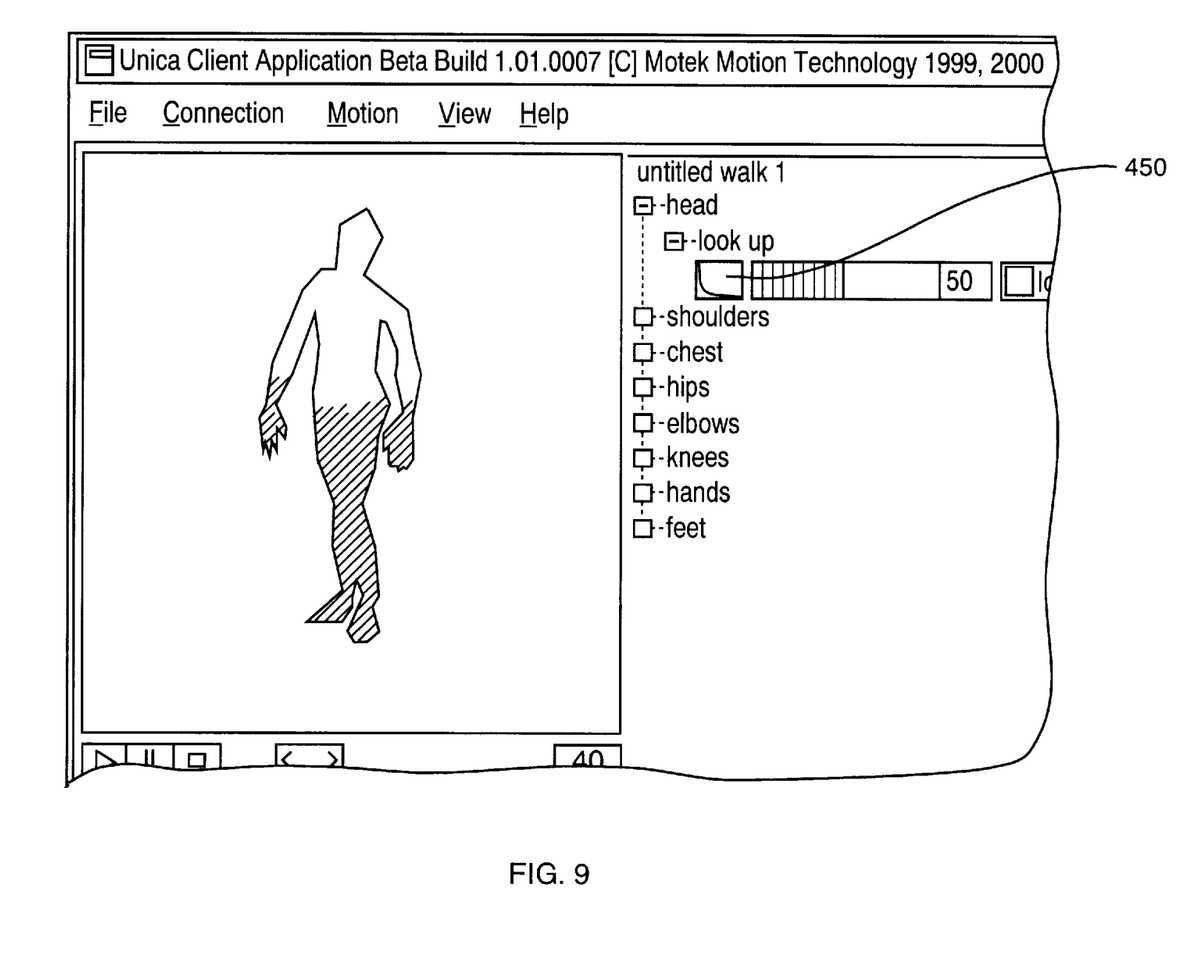
FIG. 9 Exponential decay distribution for leaking.

There is Exponential Decay, resulting in less leakage along the body depicted in FIG. 9. This is developed to variable decay (velocity based). The leakage icon 450 shows the representation for exponential decay under the blending type.

Figure 10:
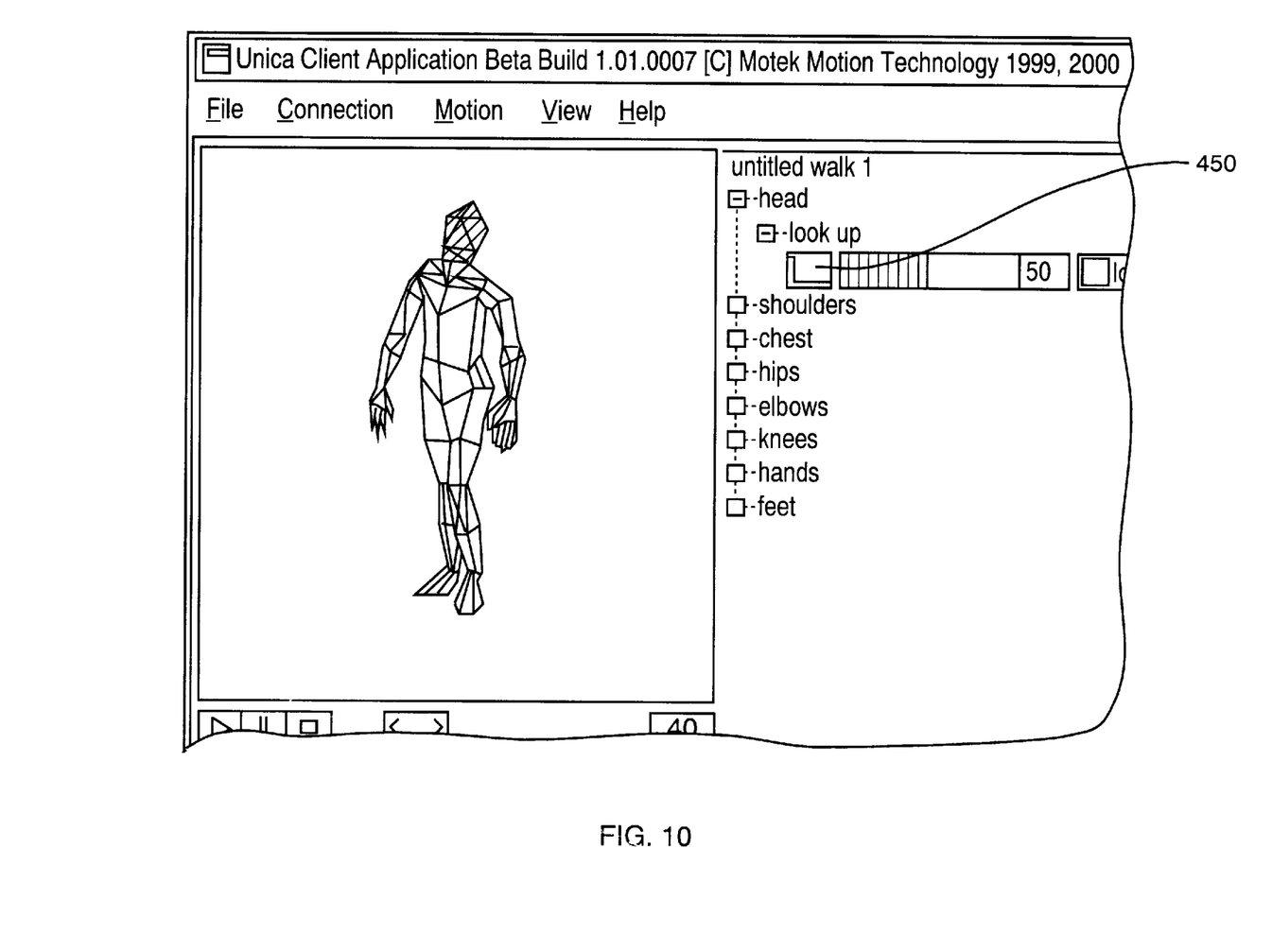
FIG. 10 Cutoff decay distribution for leaking.

Finally, Cutoff equates to No leakage at all and is shown in FIG. 10. The Cutoff can cause unrealistic results, and be used in developing unrealistic modes or "clown modes". Using cutoff blend type for multiple sources for the same body part, will result in linear blend between them. The leakage icon 450 shows the representation for cutoff under the blending type.

A Bandwidth Usage Meter 360 (located at the lower right-hand corner of the browser) is a gauge of how much of the available bandwidth is being used by the browser during the blending process. Acceptable levels are shown in green. As less bandwidth is available, the meter indicator turns yellow. At poor levels, the meter turns red. The Bandwidth Usage meter is located in the lower right-hand corner of the browser, next to the "Get 3Ddata" button 390.

When you are happy with your blend, you are ready for the next step—getting your 3D data. To start this process, click on the "Get 3D data" button 390. You will be brought to the payment screen, followed by your download options via Internet browser.

The motion capture databases of the present invention are the sources from which the motion sequences to blend are selected. This can be analogized by looking at one page from a book that has many pages, wherein this book is on a bookshelf containing many different books, and there are many bookshelves.

The page in the book you are looking at currently is dedicated to one motion, generated by one character, in one speed, inside one environment. If the same character would execute the same motion in the same speed but in a different environment (for example; strong headwind), the motion will change totally.

Inside this one page you are looking at (Book 1, generic motions/walk) are all the possible motion variances that a person is able to execute while moving in a specific speed in a specific environment. The motion variances are all available for motion blending, through the Internet.

With the client application of the present invention the user can blend in real-time, intuitively building a full body motion sequence. And, the user can do that by working on blending motions from different body parts. The body parts which are generic to the present structure are: Head, Shoulders, Chest, Hips, Elbows, Knees Hands and Feet.

The blending type controls the amount of "leakage" of motion from the active (currently under editing) body part, to the rest of the body. Since all the sources are made from full body motion capture sequences, the amount and the path of the leakage will create different blends.

In operation, once the client is successfully installed and run, there should be a moving character showing the frames sent at a rate of 15 fps from the server. The client application does not render any frames, it only sends new (blend) parameters. UNICA has been benchmarked to run at 15 fps on a 56 K modem connection. A feature that detects the connection speed and optimizes display speeds is within the scope of the invention.

The default sequence is typically a source pertaining to the Head. The name of the sequence is printed next to the blend slider. At any time the user can remove, change or add other sources. If you click on other body parts from the list, you should see the referring body part changing color on the moving figure, corresponding to the selected body part.

At any time the user can save a UPF (UNICA Parameter File). This file contains the last blend parameters you have created, and it is saved locally on your computer. If you are happy with the result and decide to buy the data, click on "Submit", and your installed web browser will take you through the payment process. Once completed and authorized, you will find the data in a directory at your members section on our web server. You can download the file directly from there, or store it for later use.

Once you have purchased motion data, your files will be still on the server for a period of one week, in this week you can still enhance or edit the blend you have created. In this week you will be charged only a % of the price in case you modify the data and want to buy the new result. That is very useful when you are dependent on production modifications.

You can always save a blend parameter file (UPF). This file contains the blend parameters only and not the final 3D capture data. UPF files are good for reference if you hit upon a blend you like to save, but want to go further blending.

Once you have the motion blend sequence you're looking for, it's time to submit your payment and download your motion data. You'll need a credit card for the final portion of this process. On the lower right portion of the client window, is a button called "Get 3D Data". Clicking this will prompt you to submit a name for your sequence. By default, the name will be Untitled, unless you have saved your settings, in which case it will use the save name. Click OK, and your web browser will load and you will be asked to input your UNICA Username and Password. Type these in and hit OK.

Once logged in, you will see a small table with your information in it, as well as the sequence you created, a transaction number, and the amount it will cost you. From here you can Cancel your order, or hit Pay Now and continue on.

Next you will be brought to a payment screen, where it again gives you a summary of your order. Here you will have to enter your credit card number and expiration date to obtain your motion data. Once you have these entered, you can hit Pay to obtain your data. After your payment has been submitted, you will be brought to a ftp area that contains a single .UMF file, or UNICA Motion File, with the name you supplied for the sequence. Click on it and choose Save File . . . and save it to any location you like.

UNICA Motion Files (UMF) are the result of the blends. They contain the capture marker positions and the joint rotation values of the skeleton. Those files can be converted to formats used by most 3D Vendors. Currently in the UNICA Beta UMF output files are compatible with SOFTIMAGE 3D SP2, SOFTIMAGE SUMATRA (Beta), Maya, Lightwave, and 3D-Max. The user can download the converters from the website for different operating systems, and use them locally. Installation instructions are available at the converter download page. UNICA Motion File, with the name you supplied for the sequence. Click on it and choose Save File . . . and save it to any location you like.

UNICA Motion Files (UMF) are the result of the blends. They contain the capture marker positions and the joint rotation values of the skeleton. Those files can be converted to formats used by most 3D Vendors. Currently in the UNICA Beta UMF output files are compatible with SOFTIMAGE 3D SP2, SOFTIMAGE SUMATRA (Beta), Maya, Lightwave, and 3D-Max. The user can download the converters from the website for different operating systems, and use them locally. Installation instructions are available at the converter download page.

A typical converter command will look like: Umf2soft<umf filename><output filename>(in case of SoftImage files a .dsc scene file) The UMF file conversion will result in a scene file containing a hierarchy of nulls representing the motion capture markers, and a skeleton containing joint rotation values.

As an example of one method of purchasing the customized animation is by the frame. For example, the following table shows a purchasing methodology, as well as demonstrating the price in comparison to the thousands of dollars normally associated with customized animation.

TABLE B

Example of Pricing Policy (not actual pricing)

| Motion Type | Price Per Frame (USD) | Average No. Frames | Average Cost |
| --- | --- | --- | --- |
| Walk | $2.50 | 40 | $100 |
| Run | $2.50 | 22 | $55 |
| Fall | $4.00 | 60 | $240 |
| Squat | $4.00 | 60 | $240 |
| Shot | $4.00 | 60 | $240 |
| Wait | $2.00 | 50 | $100 |
| Jump | $2.00 | 50 | $100 |

As part of gaining access to the server, there is an application step, wherein a user completes and application on-line and receives a password to login to the server. When the user is done and has paid, the downloading comprises a step of converting the motion sequences into a user selected format. Furthermore, there is a step of saving the motion sequence on a local system in a format only readable by the server.

The invention also has a method of purchasing animation in realtime over a network, comprising the steps of opening a client application on a local system, establishing a network connection to an animation server, selecting a motion sequence from the server, customizing the motion sequence in realtime, purchasing the motion sequence on-line, downloading the motion sequence onto the local system. Additionally, a method, wherein the step of purchasing is based upon the number of frames.

Additionally the invention is a customizable animation system, comprising a local computer system with a memory means and network means, an animation server with a network means, wherein the server is interconnected to a motion capture library, and wherein the server is connected to the local computer system by the network means, a means of selecting a motion sequence by the local computer system, a means of customizing said motion sequence, and a means of storing the motion sequence into a useable form onto the local computer system. The means of blending incorporates environmental information, and is a blending algorithm, wherein the blending algorithm uses inverse kinematics and/or genetics algorithm.

The invention is susceptible of many variations, all within the scope of any potential claims. The preferred embodiment described herein and illustrated in the figures should not be construed as in any way limiting.

What is claimed is:

1. A method for creating customized animation in real time over a network, comprising the steps of:

establishing a connection from a local system to a host system, wherein said host system is interconnected to a motion capture library;

selecting a motion sequence from said motion capture library, wherein said motion sequence is comprised of a plurality of frames of motion capture data;

accessing a blending system residing on said local system;

customizing said motion sequence in real time, wherein said customizing is a blending of said frames with real time input by an operator to generate a customized motion sequence;

viewing said customized motion sequence in real time during said step of customizing;

purchasing said customized motion sequence; and downloading said customized motion sequence onto said local system.

2. The method according to claim 1, wherein said step of blending is accomplished using the types selected from the group comprising: constant decay, linear decay, exponential decay, and cutoff.

3. The method according to claim 1, wherein said step of blending is selected from the group comprising: forward kinematics, inverse kinematics, Lagrange processing and genetic algorithms.

4. The method according to claim 1, further comprising an application step, wherein said step of establishing said network connection further comprise logging on with a password.

5. The method according to claim 1, wherein said step of downloading comprises a step of converting said customized motion sequence into a user selected format.

6. The method according to claim 1, further comprising a step of saving said motion sequence on a local system in a format readable only by said host system.

7. The method according to claim 1, wherein said step of establishing is selected from the group comprising: wireless, internet, and intranet.

8. The method according to claim 1, further comprising the step of compressing said customized motion sequence.

9. The method according to claim 1, further comprising the step of downloading said blending unit to said local system.

10. The method according to claim 1, wherein said step of purchasing is based upon a number of said frames of said customized motion sequence.

11. An animation system for customizing a motion sequence, comprising;

a local computer;

a main server, wherein said server is interconnected to a motion capture library, and wherein said server is connected to said local computer by a network;

a means for selecting a motion sequence by said local computer;

a blend engine for customizing said motion sequence, wherein said blend engine has a means for interactive control, and wherein said blend engine resides on said local computer;

a means for purchasing said motion sequence; and a means for downloading said motion sequence to said local computer.

12. The system according to claim 11, wherein said blend engine incorporates environmental information.

13. The system according to claim 11, wherein said blend engine uses the types selected from the group comprising: constant decay, linear decay, exponential decay, and cutoff.

14. The system according to claim 11, wherein said blend engine is selected from the group comprising: forward kinematics, inverse kinematics, Lagrange processing and genetic algorithms.

15. The system according to claim 11, wherein said means for downloading converting said motion sequence into a user selected format.

16. The system according to claim 11, wherein said blend engine is selected from the group comprising: forward kinematics, inverse kinematics, Lagrange processing and genetic algorithms.

17. The system according to claim 11, wherein said means for downloading converting said motion sequence into a user selected format.

18. The system according to claim 11, wherein said means for purchasing is based upon a number of frames of said motion sequence.

* * * * *